C. A. CLINE, Jr.
ATTACHMENT FOR MOTOR VEHICLES.
APPLICATION FILED JULY 7, 1909.
972,821.
Patented Oct. 18, 1910.
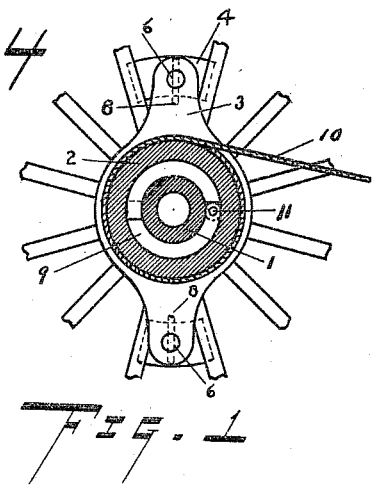
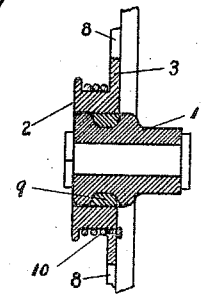
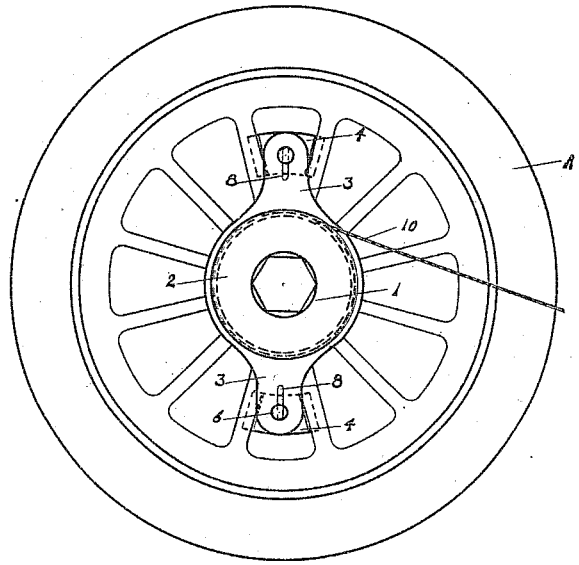
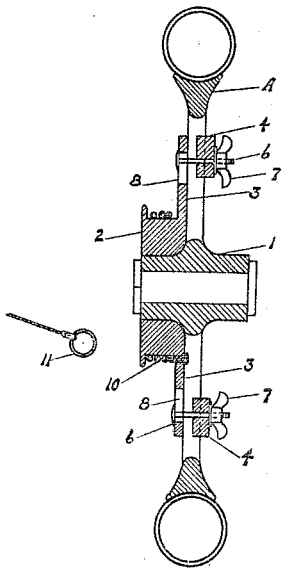
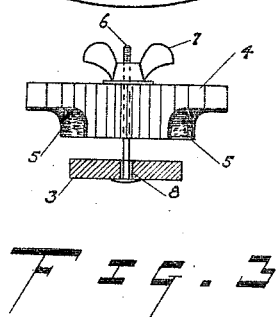
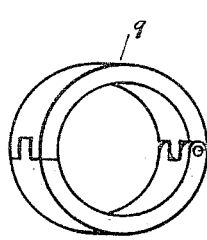
WITNESSES:
J. W. Widenmann
Ralph S. Warfield
INVENTOR
Charles A. Cline, Jr.
BY
Geo. B. Willcox
ATTORNEY

UNITED STATES PATENT OFFICE.

CHARLES A. CLINE, JR., OF WEST BRANCH, MICHIGAN.

ATTACHMENT FOR MOTOR-VEHICLES.

972,821.

Specification of Letters Patent. Patented Oct. 18, 1910.

Application filed July 7, 1909. Serial No. 506,337.

*To all whom it may concern:*

Be it known that I, CHARLES A. CLINE, Jr., a citizen of the United States, residing at West Branch, in the county of Ogemaw and State of Michigan, have invented certain new and useful Improvements in Attachments for Motor-Vehicles; and I do hereby declare the following to be a full, clear, and exact description of the invention, such as will enable others skilled in the art to which it appertains to make and use the same.

The present invention relates to improvements in attachments for motor vehicles by means of which the power of the vehicle may be utilized to draw it from ruts or depressions in a roadway or through mud or sand which would prevent the advance of the vehicle under ordinary circumstances.

Particularly, the object of the invention is to provide a compact and simple means which can be readily applied to a driving wheel of the vehicle and which when not in use will occupy but a minimum amount of space enabling it to be carried in the box or receptacle provided for carrying tools.

In the accompanying drawings,—Figure 1 is a side elevation of a driving wheel of a motor vehicle having the improved attachment applied thereto; Fig. 2 is a sectional view through the wheel and attachment; Fig. 3 is a detail sectional view through the clamping means; Fig. 4 is a view partly in section through the winding drum and hub of the wheel; and Figs. 5 and 6 illustrate a form of the invention applicable to hubs which are not cylindrical throughout their length.

Referring to the drawings, A indicates the driving wheel of a motor vehicle, and 1 the hub thereof. The attachment constituting the present invention includes a drum 2 adapted to be slipped over and bear on the hub 1, said drum having radially projecting arms 3 at its inner end. Suitable means are provided for securely clamping the arms 3 to the spokes of the wheel. As shown, such means comprise a plurality of clamping blocks 4, there being one of such blocks for each radial arm 3, and each of said blocks is adapted to fit closely between and bear against the inner face of two adjacent spokes of the wheel. That is, the outer face of each block is provided at its ends with opposite diverging grooves 5, and each block is connected with one of the arms 3 by a headed bolt 6 extending through a slot 8 in the arm and engaged at its inner threaded end by a wing nut 7. By turning the nut 7 it will be seen that the arm 3 and block 4 will be drawn into close engagement with opposite faces of the engaged spokes so that the drum will be rigidly secured to the wheel and turn therewith. The faces of the grooves 5 and the inner surface of the arms 3 may be faced with leather or other material to prevent marring the spokes.

A cable 10 has one end secured to the drum and is provided at its opposite end with a ring or eye 11 adapted to be engaged with a suitable stake, pin or other stationary object.

Many motor vehicles are provided with hubs which are of distinctive outline and not perfectly cylindrical. That is, such hubs are frequently of the general form indicated in Fig. 5 having a bead or rim at the outer end. In order that the attachment may be applied to hubs of this character and the drum given a firm and secure bearing on the hub without danger of marring or injuring the latter, there is provided a sectional sleeve or collar 9, the inner surface of which is caused to conform to the particular hub to which it is to be applied, and the drum is then fitted about such sleeve and hub. It will be understood that the form of the sleeve 9 will depend upon and be varied so that in every case it will correspond to the outline of the particular hub on which it is to be applied. The sections of the sleeve or collar 9 may be connected in any suitable way as, for instance, by a hinge or pivotal joint 11ᵃ.

The manner of using the invention may be briefly described as follows:—In case the character of the road bed is such that the progress of the vehicle is prevented, such, for instance, as by being sandy, or too steep, or, if one or more of the wheels is engaged by a deep rut, the attachment is applied to one of the driving wheels and the loop or eye 11 at the free end of the cable 10 engaged with a suitable stationary object. By then operating the engine and rotating the wheel A the cable 10 will be wound upon the drum and the pull or draft exerted will act to move the vehicle, such operation being repeated until the vehicle has passed the obstruction or is again upon such a section of the road as will enable it to be propelled in the ordinary manner.

The attachment is also adapted to return motor vehicles to a road in case they have by accident gone over an embankment or down a declivity at one side of the road.

While the form of attachment herein shown is one which has been found very satisfactory it will of course be understood that there can be modification of some of the features illustrated without departing from the invention.

Having thus described the invention, what is claimed is:

1. An attachment for motor vehicles for the purpose described, comprising a drum adapted to be fitted about the hub of a driving wheel of a motor vehicle and provided at its inner end with a plurality of radially projecting arms each adapted to extend over a portion of the space or opening between two spokes of the wheel, a block extending transversely of each of said arms and having oppositely diverging grooves adjacent its ends for receiving spokes of the wheel, means connecting the blocks and arms, and a cable having one end attached to the drum.

2. An attachment for motor vehicles for the purpose described, comprising a drum adapted to be fitted about the hub of a driving wheel of a motor vehicle and provided at its inner end with a plurality of radially projecting arms each adapted to extend over a portion of the space or opening between two spokes of the wheel, a block extending transversely of each of said arms and having oppositely diverging grooves formed at the ends of its face adjacent the arm, whereby said arms and blocks will engage opposite faces of spokes between which the blocks extend, an adjustable connection between each block and the adjacent arm, and a cable having one end attached to the drum.

3. An attachment for motor vehicles for the purpose described, comprising a hollow drum adapted to be fitted about the hub of a driving wheel of a motor vehicle, and provided at its inner end with a plurality of radially projecting arms each adapted to extend over a portion of th space between two spokes of the wheel, a two part sleeve, having its members pivotally connected, adapted to surround a portion of the hub within the drum, the exterior surface of said sleeve conforming to the adjacent inner surface of the drum, blocks adjustably connected with the radial arms and adapted to engage spokes of the vehicle wheel, and a cable having one end attached to the drum.

In testimony whereof, I affix my signature in presence of two witnesses.

CHARLES A. CLINE, Jr.

Witnesses:
RALPH S. WARFIELD,
CHRISTINE A. BRAIDEL.